United States Patent
Takahashi

(10) Patent No.: US 10,429,995 B2
(45) Date of Patent: Oct. 1, 2019

(54) COORDINATE DETECTING APPARATUS

(71) Applicant: RICOH COMPANY, LTD., Tokyo (JP)

(72) Inventor: Masato Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 15/620,976

(22) Filed: Jun. 13, 2017

(65) Prior Publication Data

US 2018/0018062 A1 Jan. 18, 2018

(30) Foreign Application Priority Data

Jul. 13, 2016 (JP) ................................. 2016-138113

(51) Int. Cl.
*G01B 21/04* (2006.01)
*G01J 1/42* (2006.01)
*G06F 3/042* (2006.01)

(52) U.S. Cl.
CPC ........... *G06F 3/0425* (2013.01); *G01B 21/04* (2013.01); *G01J 1/4204* (2013.01); *G06F 3/042* (2013.01); *G06F 3/0421* (2013.01)

(58) Field of Classification Search
CPC ........ G01B 21/04; G01J 1/4204; G06F 3/042; G06F 3/0421
USPC ......................................... 702/104, 150, 189
See application file for complete search history.

(56) References Cited

U.S. PATENT DOCUMENTS

| | | | | |
|---|---|---|---|---|
| 5,355,149 A | * | 10/1994 | Casebolt | G06F 3/0421 250/221 |
| 2006/0145365 A1 | * | 7/2006 | Halls | B82Y 10/00 347/238 |
| 2006/0159468 A1 | | 7/2006 | Kouchi et al. | |
| 2006/0159469 A1 | | 7/2006 | Furuichi et al. | |
| 2009/0119427 A1 | | 5/2009 | Takahashi | |
| 2013/0307830 A1 | * | 11/2013 | Bao | G06F 3/0425 345/179 |
| 2013/0321562 A1 | | 12/2013 | Takahashi | |
| 2014/0063545 A1 | | 3/2014 | Takahashi et al. | |
| 2014/0075020 A1 | | 3/2014 | Takahashi et al. | |
| 2014/0078244 A1 | | 3/2014 | Kitazawa et al. | |
| 2014/0371892 A1 | | 12/2014 | Takahashi | |
| 2015/0002028 A1 | * | 1/2015 | Chen | H05B 33/0848 315/153 |
| 2015/0029157 A1 | * | 1/2015 | Wang | G06F 3/03547 345/175 |

(Continued)

FOREIGN PATENT DOCUMENTS

JP 2008-276325 11/2008
JP 2014-021790 2/2014

*Primary Examiner* — John E Breene
*Assistant Examiner* — Jeffrey P Aiello
(74) *Attorney, Agent, or Firm* — Oblon, McClelland, Maier & Neustadt, L.L.P.

(57) ABSTRACT

A coordinate detecting apparatus includes a plurality of light-receiving sensors and a controller. The plurality of light-receiving sensors detect light emitted from a light-emitting member in a detection area. The controller detects a position of the light-emitting member based on the light detected by the plurality of light-receiving sensors, and controls the light-emitting member such that an intensity of the light emitted from the light-emitting member is higher than an intensity of ambient light incident on the plurality of light-receiving sensors.

8 Claims, 16 Drawing Sheets

(56) References Cited

U.S. PATENT DOCUMENTS

| | | | |
|---|---|---|---|
| 2015/0177852 A1* | 6/2015 | Rankl | G06F 3/0304 |
| | | | 250/214.1 |
| 2015/0264317 A1 | 9/2015 | Takahashi | |
| 2015/0372761 A1* | 12/2015 | Boutaud | H04B 10/516 |
| | | | 398/140 |
| 2017/0013225 A1 | 1/2017 | Takahashi et al. | |
| 2017/0019635 A1 | 1/2017 | Kuwata et al. | |
| 2017/0019636 A1 | 1/2017 | Kitazawa et al. | |
| 2017/0032555 A1 | 2/2017 | Gingawa et al. | |
| 2017/0034474 A1 | 2/2017 | Goto et al. | |
| 2017/0034480 A1 | 2/2017 | Goto et al. | |
| 2017/0034481 A1 | 2/2017 | Igarashi et al. | |
| 2017/0041570 A1 | 2/2017 | Takahashi et al. | |
| 2017/0078616 A1 | 3/2017 | Uchiyama et al. | |
| 2017/0127017 A1 | 5/2017 | Takahashi et al. | |
| 2017/0127020 A1 | 5/2017 | Takahashi et al. | |
| 2017/0174122 A1* | 6/2017 | Cheng | B60Q 1/323 |
| 2018/0376558 A1* | 12/2018 | Verbakel | H05B 33/0845 |

* cited by examiner

LIGHT-RECEIVING SENSOR 300

LIGHT-RECEIVING SENSOR 310

FIG. 16A
LIGHT-RECEIVING SENSOR 300
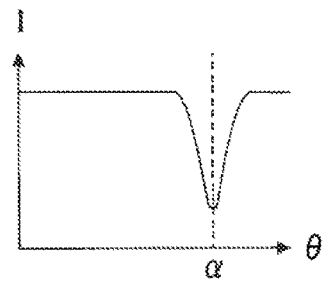
FIG. 16B
LIGHT-RECEIVING SENSOR 310
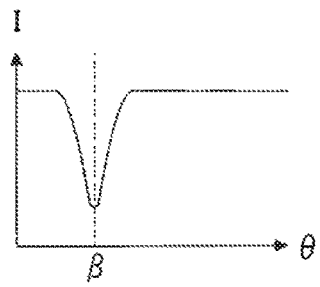
FIG. 17
ILLUMINATING LIGHT SOURCES 410 AND 420 ⟶ TIME
FIG. 18
ILLUMINATING LIGHT SOURCES 410 AND 420 ⟶ TIME
AMBIENT LIGHT ⟶ TIME

LIGHT-RECEIVING SENSOR 300

LIGHT-RECEIVING SENSOR 310

LIGHT-RECEIVING SENSOR 300

LIGHT-RECEIVING SENSOR 310

LIGHT-RECEIVING SENSOR 300

LIGHT-RECEIVING SENSOR 310

LIGHT-RECEIVING SENSOR 300

LIGHT-RECEIVING SENSOR 310

LIGHT-RECEIVING SENSOR 300

LIGHT-RECEIVING SENSOR 310

LIGHT-RECEIVING SENSOR 300

LIGHT-RECEIVING SENSOR 310

COORDINATE DETECTING APPARATUS

CROSS-REFERENCE TO RELATED APPLICATION

This patent application is based on and claims priority pursuant to 35 U.S.C. § 119(a) to Japanese Patent Application No. 2016-138113 filed on Jul. 13, 2016, in the Japan Patent Office, the entire disclosure of which is hereby incorporated by reference herein.

BACKGROUND

Technical Field

The present invention relates to a coordinate detecting apparatus.

Description of the Related Art

In recent years, an electronic information board having a flat panel display, such as a liquid crystal display, equipped with a touch panel has been used in face-to-face or remote meetings, for example. Such an electronic information board detects the position of contact of an electronic pen or a finger of an operator, for example, on a display area of the display.

For example, to detect the contact of an object on the image display area, a plurality of light-receiving sensors (e.g., cameras) respectively including light-emitting members may be provided around the outer circumference of the image display area to detect light from the light-emitting members with the light-receiving sensors. In this case, if an object contacts the image display area, the light from the light-emitting members is intercepted at the point of contact, which is detected by triangulation based on the angle at which the light is intercepted.

Alternatively, a light-emitting pen including a light-emitting member may be used to detect light from the light-emitting member with a plurality of light-receiving sensors (e.g., cameras) disposed around the outer circumference of the image display area. In this case, if the light-emitting pen contacts the image display area, the light from the light-emitting member is incident on the light-receiving sensors, and the point of contact is detected by triangulation based on the angle of incidence of the light.

SUMMARY

In one embodiment of this invention, there is provided an improved coordinate detecting apparatus that includes, for example, a plurality of light-receiving sensors and a controller. The plurality of light-receiving sensors detect light emitted from a light-emitting member in a detection area. The controller detects a position of the light-emitting member based on the light detected by the plurality of light-receiving sensors, and controls the light-emitting member such that an intensity of the light emitted from the light-emitting member is higher than an intensity of ambient light incident on the plurality of light-receiving sensors.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 16A and 16B are graphs each illustrating the relationship between the angle and the received light amount detected by the light-receiving sensor when the interceptor is used;

FIG. 17 is a chart illustrating detection of coordinates performed when the interceptor is used;

FIG. 18 is a chart illustrating detection of coordinates performed when the interceptor is used and the ambient light is intense;

Figure 1:
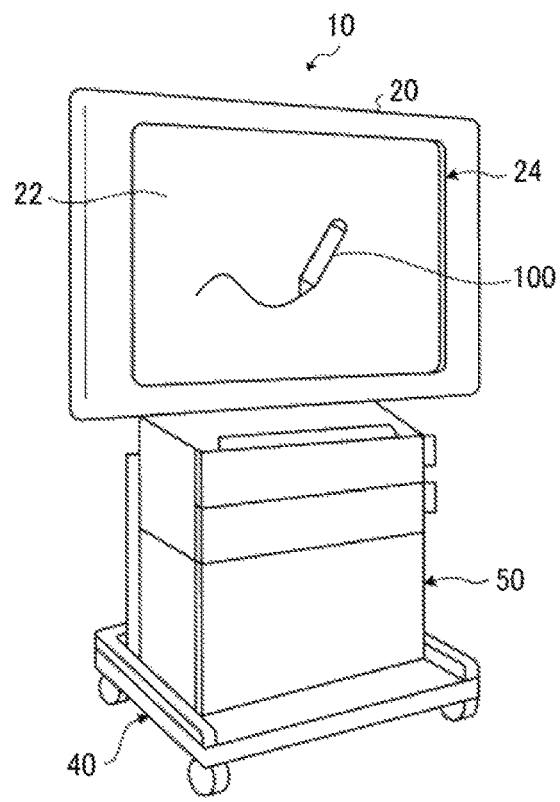
FIG. 1 is a perspective view of an electronic information board system using a stylus input device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the accompanying drawings, wherein like reference numerals designate identical or corresponding parts throughout the several views, embodiments of the present invention will be described.

A first embodiment of the present invention will be described.

A description will first be given of an electronic information board system including a coordinate detecting apparatus according to the first embodiment.

FIG. 1 is a perspective view of the electronic information board system including the coordinate detecting apparatus according to the first embodiment. As illustrated in FIG. 1, an electronic information board system 10 includes a display unit 20, a stand 40, and an equipment storage unit 50. The display unit 20 includes a flat panel, such as a liquid crystal panel or a plasma panel. A front surface of a housing of the display 20 is formed with a touch panel 24 and a display surface 22 that displays an image.

When an end portion of an interceptor or a light-emitting pen contacts the display surface 22 to write a character or a draw a figure, for example, the electronic information board system 10 displays the character or the figure written or drawn at the position of coordinates (i.e., coordinate position) detected by the touch panel 24. In the following description of the present embodiment, the electronic information board system 10 is used with a stylus input device 100, which is a light-emitting pen, in a light-emitting pen detection mode.

Figure 2:
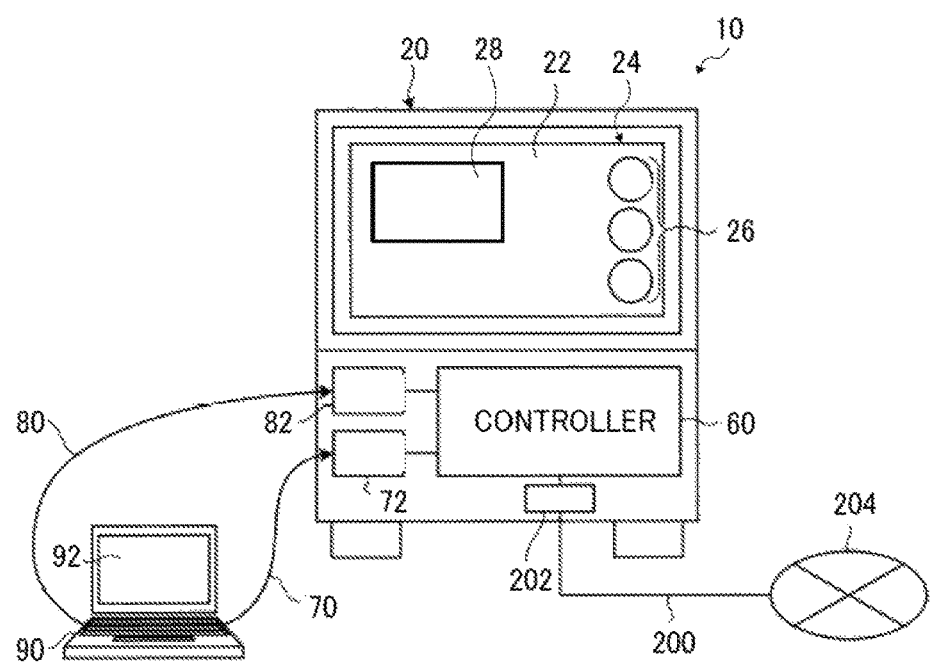
FIG. 2 is a schematic diagram illustrating a structure of main components of the electronic information board system.
Figure 3:
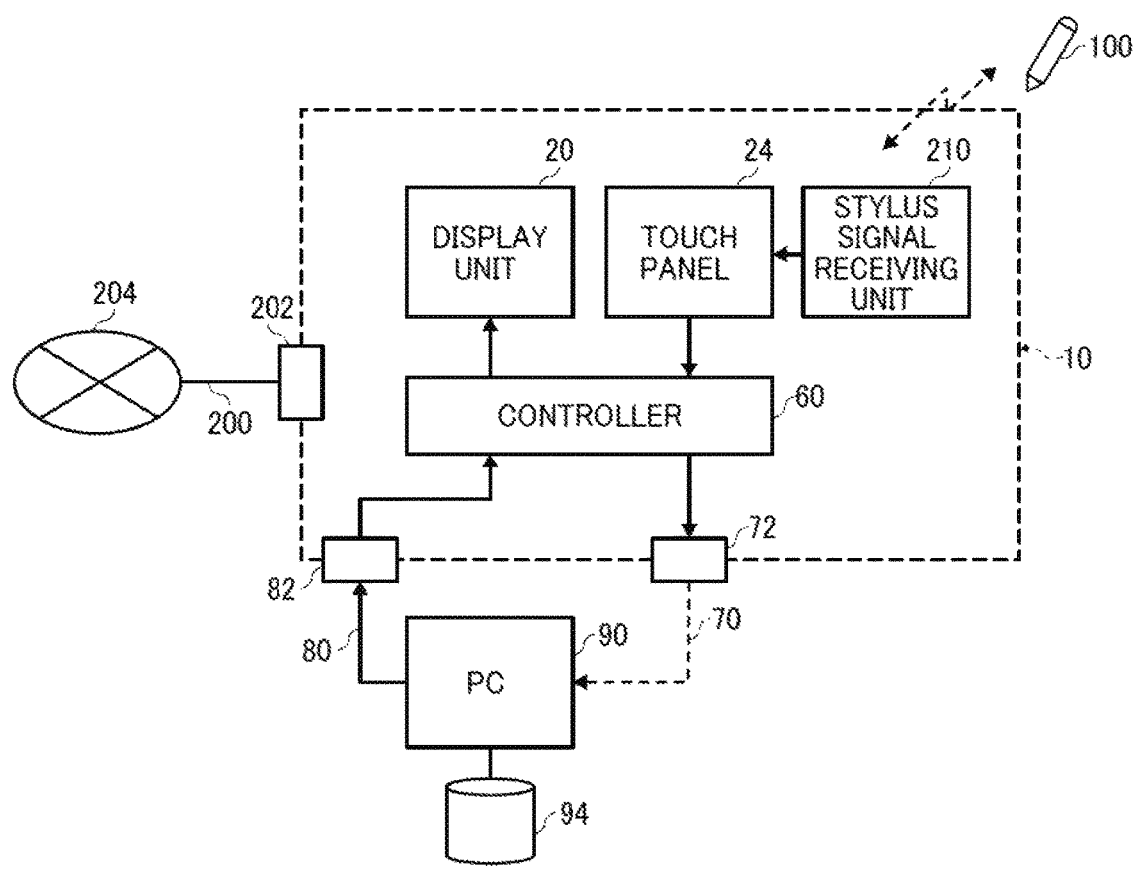
FIG. 3 is a block diagram illustrating a control system of the electronic information board system.

FIG. 2 is a schematic diagram illustrating a structure of main components of the electronic information board system 10. FIG. 3 is a block diagram illustrating a control system of the electronic information board system 10. As illustrated in FIGS. 2 and 3, the electronic information board system 10 includes a controller 60, the display unit 20, the touch panel 24, and a stylus signal receiving unit 210. The controller 60 controls the display unit 20 to display, on the display surface 22, a variety of screen operation units 26 for receiving input operations and an image captured from a personal computer (PC) 90. The controller 60 has a universal serial bus (USB) socket 72 and a video graphics array (VGA) input socket 82, which are connected to a USB cable 70 and a VGA cable 80, respectively. The controller 60 is a central processing unit (CPU) that executes a variety of processes in accordance with programs, or a circuit such as an application specific integrated circuit (ASIC).

The PC 90 is connected to the controller 60 via the USB socket 72 and the VGA input socket 82. The PC 90 includes a monitor 92 illustrated in FIG. 2 and a storage 94 illustrated in FIG. 3, such as a magnetic disk device, to store a variety of content and programs such as content display application software.

If an operator selects a desired content item from the content stored in the storage 94, the monitor 92 displays the selected content item. If the image data of the image displayed on the monitor 92 of the PC 90 is transferred to the electronic information board system 10 via the USB cable 70 and the VGA cable 80, the controller 60 displays, on a PC screen 28 of the display unit 20, the image displayed on the monitor 92. The controller 60 is connected to a network 204, such as the Internet or a local area network (LAN), via a network socket 202 and a communication line 200 such as an optical fiber.

Figure 4:
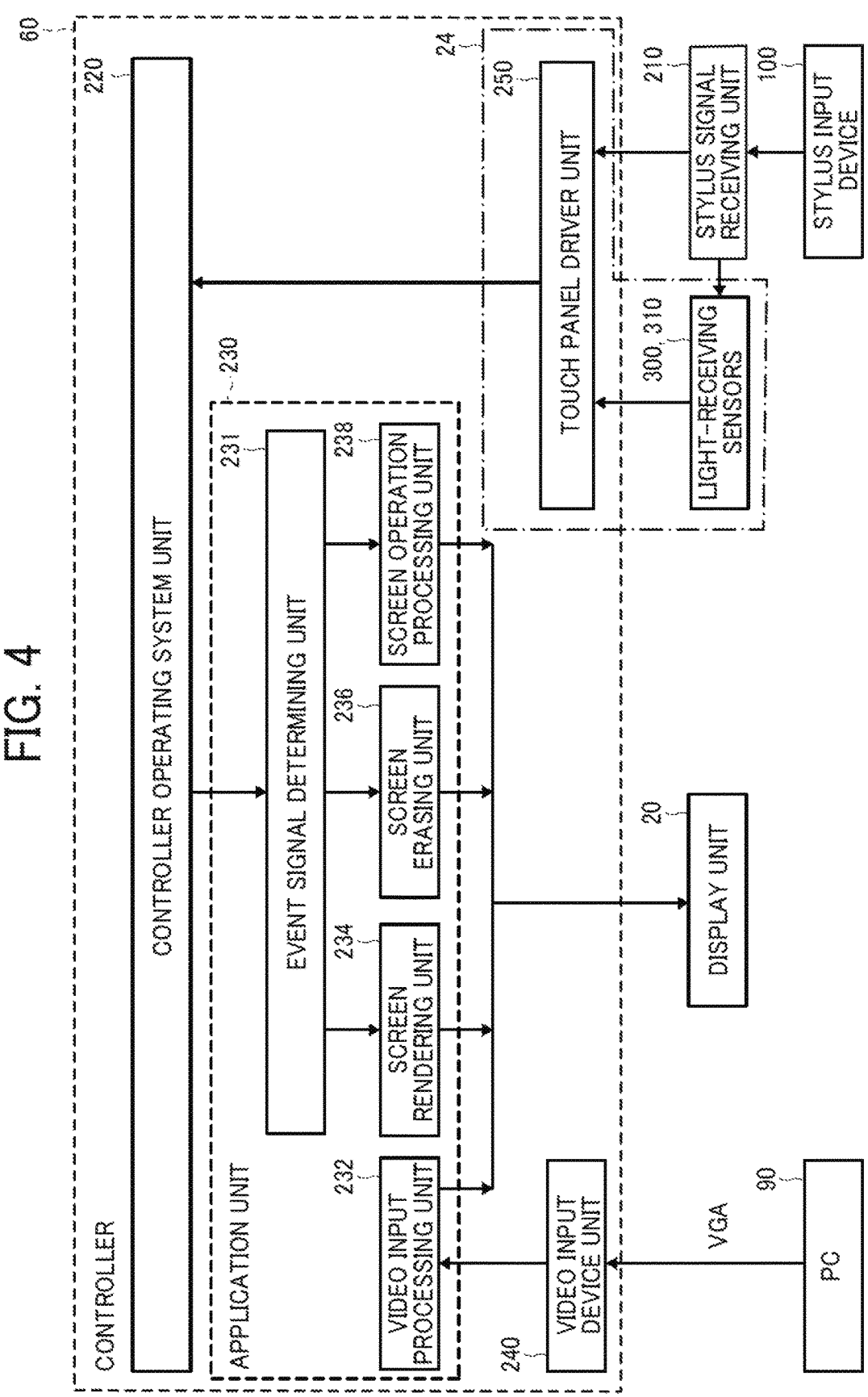
FIG. 4 is a block diagram illustrating a configuration of a controller of the electronic information board system.

FIG. 4 is a block diagram illustrating a configuration of the controller 60 of the electronic information board system 10. As illustrated in FIG. 4, the controller 60 of the electronic information board system 10 includes a controller operating system unit 220, an application unit 230, a video input device unit 240, and a touch panel driver unit 250. The application unit 230 includes an event signal determining unit 231, a video input processing unit 232, a screen rendering unit 234, a screen erasing unit 236, and a screen operation processing unit 238. The controller operating system unit 220 serves as a main control unit that manages and executes control processes performed by the controller 60.

The application unit 230 performs a control process for generating the entire image to be displayed on the display surface 22 of the display unit 20, a control process for displaying the image on the PC screen 28, a control process for displaying the drawn figure or the written character, for example, in response to detection of a light emission signal from the stylus input device 100 or finger contact information, and a control process of controlling a finger touch operation. The event signal determining unit 231 monitors an event signal input from the controller operating system unit 220 to perform a control process in accordance with the input event signal.

The video input processing unit 232 performs a control process for displaying the image input from the PC 90 on the PC screen 28 of the display surface 22. The image rendering unit 234 generates a graphic of handwriting input based on the data of the coordinate position input from the touch panel 24 via the event signal determining unit 231, and displays the graphic of the handwriting input on the display surface 22 of the display unit 20 as superimposed on the image already displayed on the display surface 22. The screen erasing unit 236 generates a graphic with a background color of the currently displayed image based on the information of the coordinate position input from the touch panel 24 via the event signal determining unit 231. The screen erasing unit 236 then displays the graphic of the background color on the display surface 22 of the display unit 20 as superimposed on the image already displayed on the display surface 22.

Superimposed with the graphic of the background color, the graphic of the handwriting input displayed on the display unit 20 is visually erased from the display surface 22. The screen operation processing unit 238 converts the information (i.e., signal) of the coordinate position input from the touch panel 24 into a pointing device signal, such as a mouse event signal, and performs a process in accordance with an ON or OFF operation of the screen operation units 26 displayed on the display surface 22 of the display unit 20.

The touch panel 24 has light-receiving sensors 300 and 310, which detect the coordinate position of contact of the stylus input device 100. The information of the detected coordinate position is transmitted to the controller operating system unit 220 as a mouse down event together with the corresponding coordinate values. If the stylus input device 100 is moved while in contact with the display surface 22 of the touch panel 24, the information of this movement is transmitted to the controller operating system unit 220 as a mouse up event together with the corresponding coordinate values.

The touch panel driver unit 250 converts each of a coordinate position signal input from the touch panel 24 and a writing detection signal or an erasure detection signal input from the stylus input device 100 into a predetermined event signal, and transmits the event signal to the controller operating system unit 220. If the stylus signal receiving unit 210 receives the writing detection signal or the erasure detection signal from the stylus input device 100, the touch panel driver unit 250 transmits the writing detection signal or the erasure detection signal to the controller operating system unit 220 together with the coordinate position signal.

A description will now be given of the touch panel 24, which is the coordinate detecting apparatus according to the first embodiment.

Figure 5:
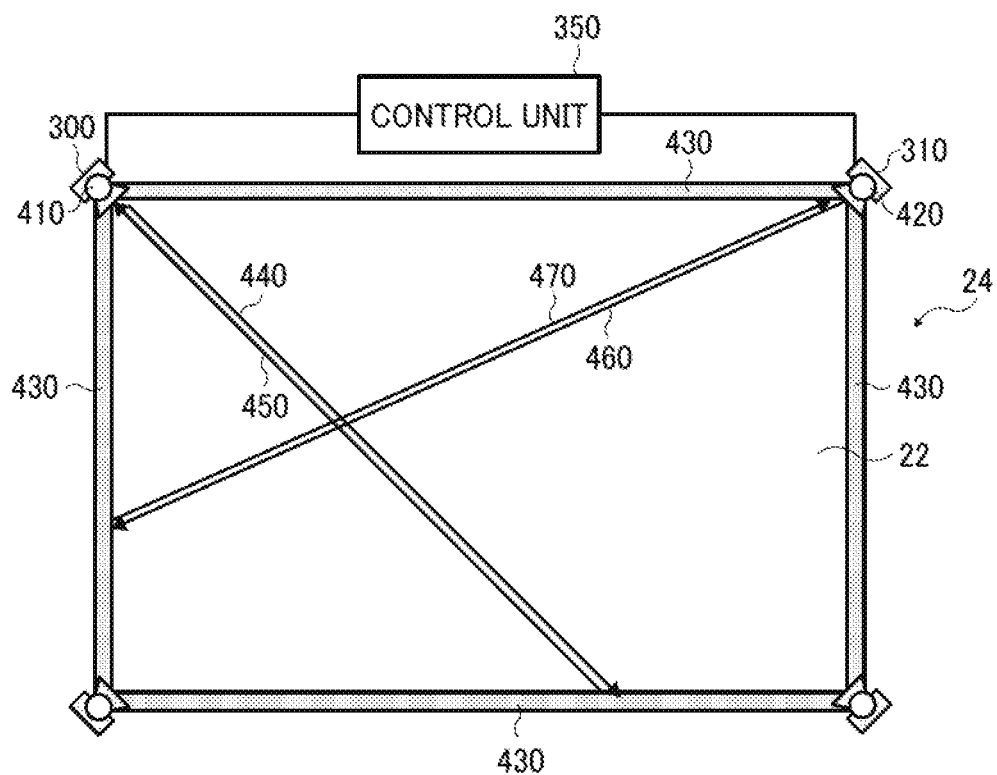
FIG. 5 is a diagram illustrating a structure of a coordinate detecting apparatus according to a first embodiment of the present invention.

FIG. 5 is a diagram illustrating a configuration of the touch panel 24 that detects the coordinate position of the light-emitting pen or the interceptor. As illustrated in FIG. 5, the touch panel 24 has the pair of light-receiving sensors 300 and 310 disposed at an upper-left corner and an upper-right corner of the rectangular display surface 22. In the first embodiment, the display surface 22 serves as a detection area.

The light-receiving sensor 300 includes an illuminating light source 410, and the light-receiving sensor 310 includes an illuminating light source 420. The touch panel 24 further has retroreflective members 430 and a control unit 350. The retroreflective members 430 (e.g., retroreflective plates) are disposed on four sides of the rectangular display surface 22. The control unit 350 is connected to the light-receiving sensors 300 and 310 and the illuminating light sources 410 and 420. The control unit 350 is a central processing unit (CPU) that executes a variety of processes in accordance with programs, or a circuit such as an application specific integrated circuit (ASIC).

The illuminating light sources 410 and 420 are used in the detection of the coordinate position with the interceptor (i.e., a non-light-emitting member), but is not used in the detection of the coordinate position with the light-emitting pen (i.e., a light-emitting member). In the detection of the coordinate position with the interceptor, light is emitted from the illuminating light source 410 along the display surface 22, reflected by the corresponding retroreflective member 430, and incident on the light-receiving sensor 300. In FIG. 5, a part of the light emitted from the illuminating light source 410 along the display surface 22 is illustrated as a beam 440, and a part of the light reflected by the retroreflective member 430 is illustrated as a beam 450.

Similarly, light is emitted from the illuminating light source 420 along the display surface 22, reflected by the corresponding retroreflective member 430, and incident on the light-receiving sensor 310. In FIG. 5, a part of the light emitted from the illuminating light source 420 along the display surface 22 is illustrated as a beam 460, and a part of the light reflected by the retroreflective member 430 is illustrated as a beam 470.

The stylus input device 100 serving as the light-emitting pen will be described with reference to FIG. 6.

Figure 6:
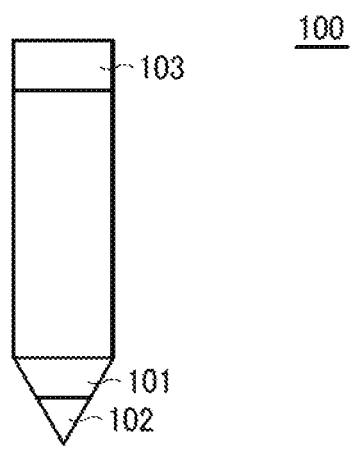
FIG. 6 is a diagram illustrating a structure of the stylus input device.

As illustrated in FIG. 6, the stylus input device 100 includes a tip portion 101, a light-emitting unit 102, and a communication unit 103. The tip portion 101 is transparent to transmit therethrough the beams from the illuminating light sources 410 and 420 and the retroreflective members 430. The light-emitting unit 102 is placed in the tip portion 101, and emits light based on the control of the control unit 350. The communication unit 103 communicates with the control unit 350. The light emitted from the light-emitting unit 102 of the stylus input device 100 is detected by the light-receiving sensors 300 and 310.

Figure 7:
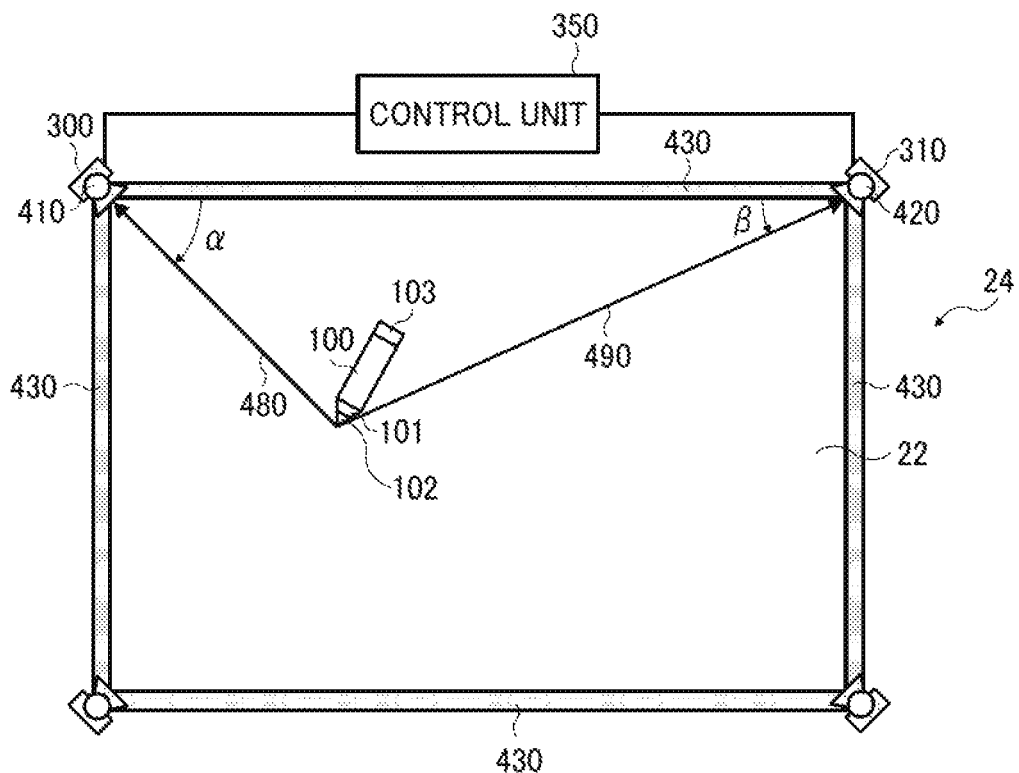
FIG. 7 is a diagram illustrating detection of coordinates performed when the stylus input device is used.

A coordinate detecting method using the stylus input device 100 will be described with reference to FIG. 7.

In the detection of the coordinates with the stylus input device 100, the touch panel 24 is placed in the light-emitting pen detection mode. Further, the control unit 350 keeps the illuminating light sources 410 and 420 in the OFF state, and turns on the light-emitting unit 102 when the tip portion 101 of the stylus input device 100 contacts the display surface 22. Therefore, beams 480 and 490 emitted from the light-emitting unit 102 of the stylus input device 100 are incident on and detected by the light-receiving sensors 300 and 310.

Based on detection signals from the light-receiving sensors 300 and 310, the control unit 350 detects the angle of inclination of the detection position of the light (e.g., infrared light) relative to the horizontal direction. The control unit 350 then calculates the coordinate position with triangulation formula, and converts the calculated coordinate position into X-Y coordinates. Then, the display unit 20 displays the written character or the drawn figure, for example, based on the coordinate position calculated by the control unit 350.

Figure 8A:
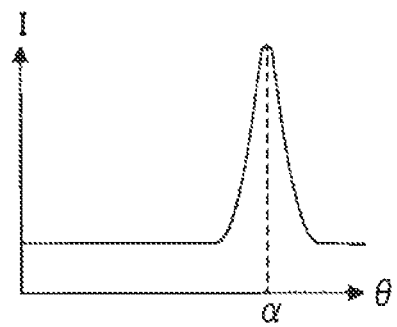
FIGS. 8A and 8B are graphs each illustrating the relationship between an angle and a received light amount detected by a light-receiving sensor when the stylus input device is used.
Figure 8B:
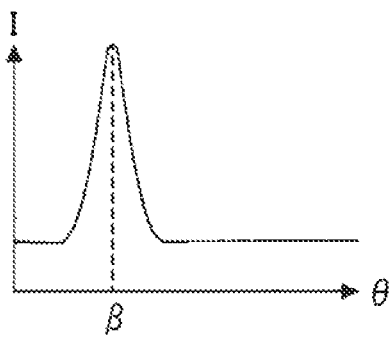

FIG. 8A illustrates the relationship between an angle $\theta$ and a received light amount I detected by the light-receiving sensor 300 when the stylus input device 100 contacts the display surface 22. FIG. 8B illustrates the relationship between the angle $\theta$ and the received light amount I detected by the light-receiving sensor 310 when the stylus input device 100 contacts the display surface 22. The control unit 350 detects an angle $\alpha$, which corresponds to the peak of the received light amount I of the light-receiving sensor 300, i.e., corresponds to the direction in which the light-emitting unit 102 of the stylus input device 100 is present. The control unit 350 further detects an angle $\beta$, which corresponds to the peak of the received light amount I of the light-receiving sensor 310, i.e., corresponds to the direction in which the light-emitting unit 102 of the stylus input device 100 is present.

In the light-emitting pen detection mode, the illuminating light sources 410 and 420 are OFF, and thus no light is emitted therefrom. Even if there is an interceptor that intercepts light, therefore, the interceptor is not detected by the light-receiving sensors 300 and 310. That is, with the illuminating light sources 410 and 420 in the OFF state, the light-receiving sensors 300 and 310 do not detect a light spot. In the light-emitting pen detection mode, therefore, the position of contact of the stylus input device 100 is detected only when the stylus input device 100 contacts the display surface 22.

TABLE 1 given below illustrates the relationship between ON and OFF of the illuminating light sources 410 and 420, ON and OFF of the light-emitting unit 102 of the stylus input device 100, and a position detecting method employed by the light-receiving sensors 300 and 310 in the light-emitting pen detection mode and an interceptor detection mode.

TABLE 1

| mode | illuminating light sources 410 and 420 | light-emitting unit 102 | detection of position by light-receiving sensors 300 and 310 |
|---|---|---|---|
| light-emitting pen detection mode | OFF | ON | calculate position based on angle maximizing received light amount |
| interceptor detection mode | ON | OFF | calculate position based on angle minimizing received light amount |

As illustrated in TABLE 1, in the light-emitting pen detection mode, the coordinate position is calculated based on the angle maximizing the received light amount of the light-receiving sensor 300 and the angle maximizing the received light amount of the light-receiving sensor 310 when the illuminating light sources 410 and 420 are OFF and the light-emitting unit 102 of the stylus input device 100 is ON. Further, in the interceptor detection mode, the coordinate position is calculated based on the angle minimizing the received light amount of the light-receiving sensor 300 and the angle minimizing the received light amount of the light-receiving sensor 310 when the illuminating light sources 410 and 420 are ON and the light-emitting unit 102 of the stylus input device 100 is OFF.

Figure 9:
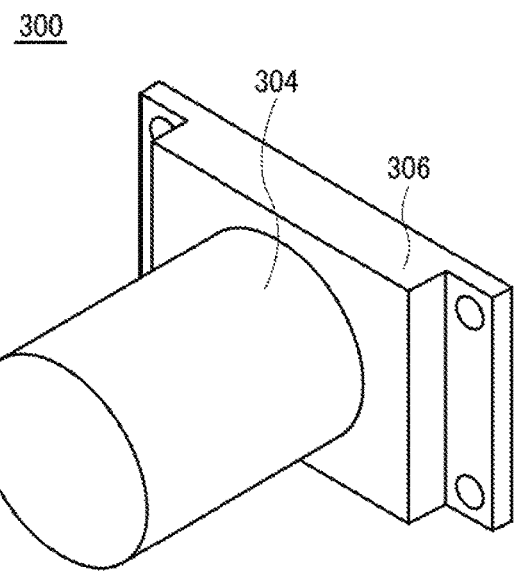
FIG. 9 is a perspective view illustrating a structure of the light-receiving sensor.

FIG. 9 is a perspective view illustrating a structure of the light-receiving sensor 300. The light-receiving sensor 300 includes an infrared light receiving lens 304 and an image sensor substrate 306. The light-receiving sensor 310 has a structure similar to that of the light-receiving sensor 300.

The coordinate detecting method according to the first embodiment will be described.

Figure 10:
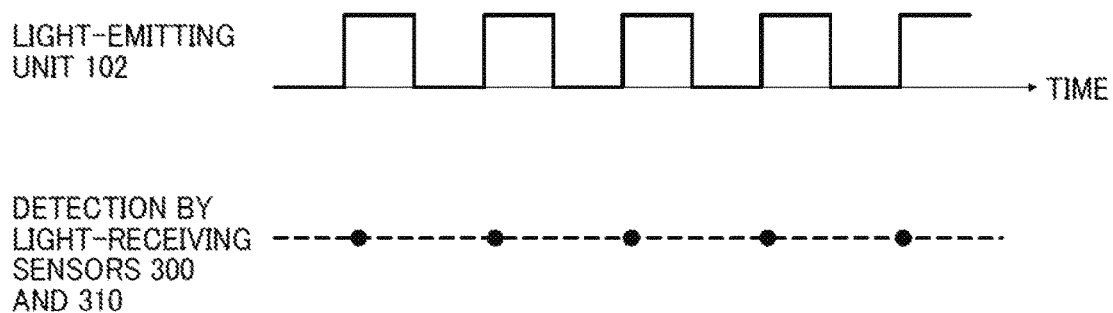
FIG. 10 is a chart illustrating detection of coordinates performed when the stylus input device is used.

In the light-emitting pen detection mode, the light-emitting unit 102 of the stylus input device 100 alternately turns on and off with a period of 4 milliseconds (ms), i.e., at 250 hertz (Hz), for example, as illustrated in FIG. 10. Herein, the duty ratio of the ON time in each period is 1/2. If the light-emitting unit 102 of the stylus input device 100 turns on in this case, the light-emitting unit 102 emits light. The emitted light is incident on the light-receiving sensors 300 and 310, and the position of the light-emitting unit 102 of the stylus input device 100 is detected. In FIG. 10, each black dot indicates the time at which the detection by the light-receiving sensors 300 and 310 takes place.

In the first embodiment, the light-emitting unit 102 of the stylus input device 100 emits infrared light, and each of the light-receiving sensors 300 and 310 is equipped with an infrared (IR) filter to allow only infrared light to be incident on the light-receiving sensors 300 and 310 through the IR filter.

Figure 11:
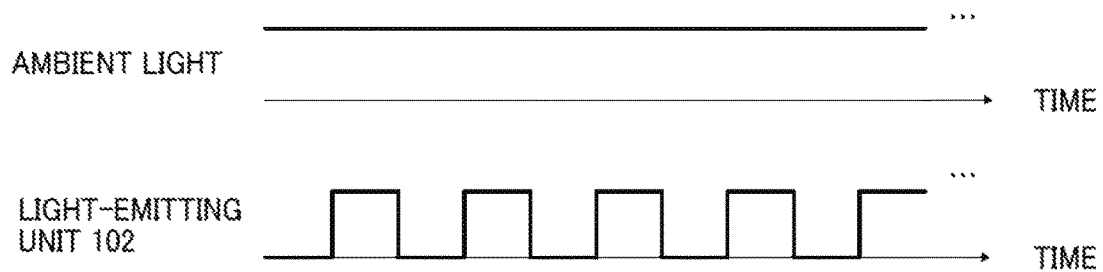
FIG. 11 is a chart illustrating detection of coordinates performed when the stylus input device is used and ambient light is intense.

Intense ambient light as illustrated in FIG. 11, however, may prevent accurate detection of the coordinate position of the stylus input device 100. For example, if the intensity of the ambient light equals or exceeds the intensity of the light emitted from the light-emitting unit 102 of the stylus input device 100, the ambient light may be incident on the light-receiving sensors 300 and 310 when no light is emitted from the light-emitting unit 102, resulting in erroneous detection of the coordinate position. Further, when the light is emitted from the light-emitting unit 102, if the ambient light and the light from the light-emitting unit 102 are incident on the light-receiving sensors 300 and 310 at the same time, the detection of the coordinate position may be degraded in accuracy. Although the light-emitting unit 102 regularly repeats ON and OFF in the above-described example, the light-emitting unit 102 may constantly be ON, or may irregularly repeats ON and OFF.

Figure 12:
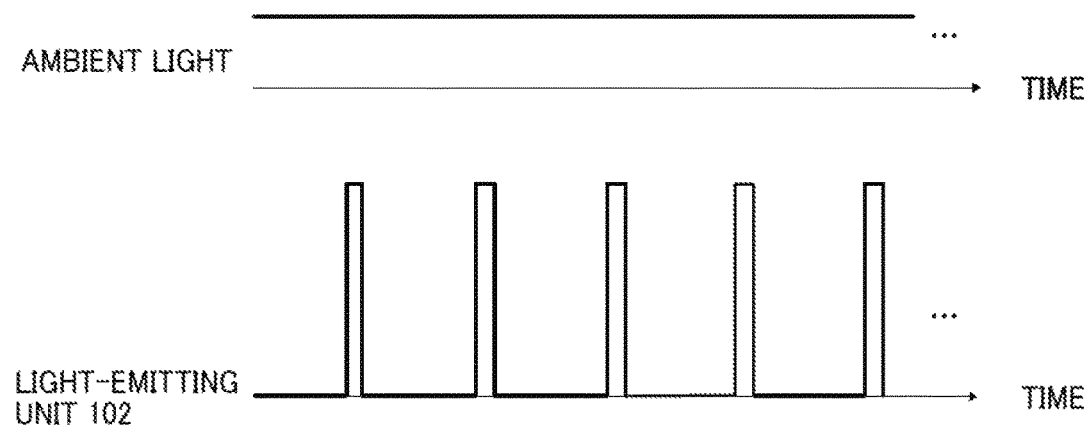
FIG. 12 is a chart illustrating detection of coordinates by the coordinate detecting apparatus according to the first embodiment.

In the first embodiment, if ambient light more intense than the light emitted from the light-emitting unit 102 of the stylus input device 100 is detected, the control unit 350 increases the intensity of the light emitted from the light-emitting unit 102 of the stylus input device 100 to be higher than the intensity of the ambient light, as illustrated in FIG. 12. In the first embodiment, the light-emitting unit 102 of the stylus input device 100 includes a light-emitting diode (LED) to emit infrared light. If the control unit 350 increases current flowing through the light-emitting unit 102, therefore, the intensity of the light emitted from the light-emitting unit 102 is increased. If the control unit 350 reduces the light-emitting time of the LED, the current flowing through the light-emitting unit 102 is increased to emit strong light. For example, if the control unit 350 reduces the light-emitting time of the LED to approximately 0.1 ms, pulsed light is emitted with the intensity of the light multiplied by approximately ten times.

Figure 13:
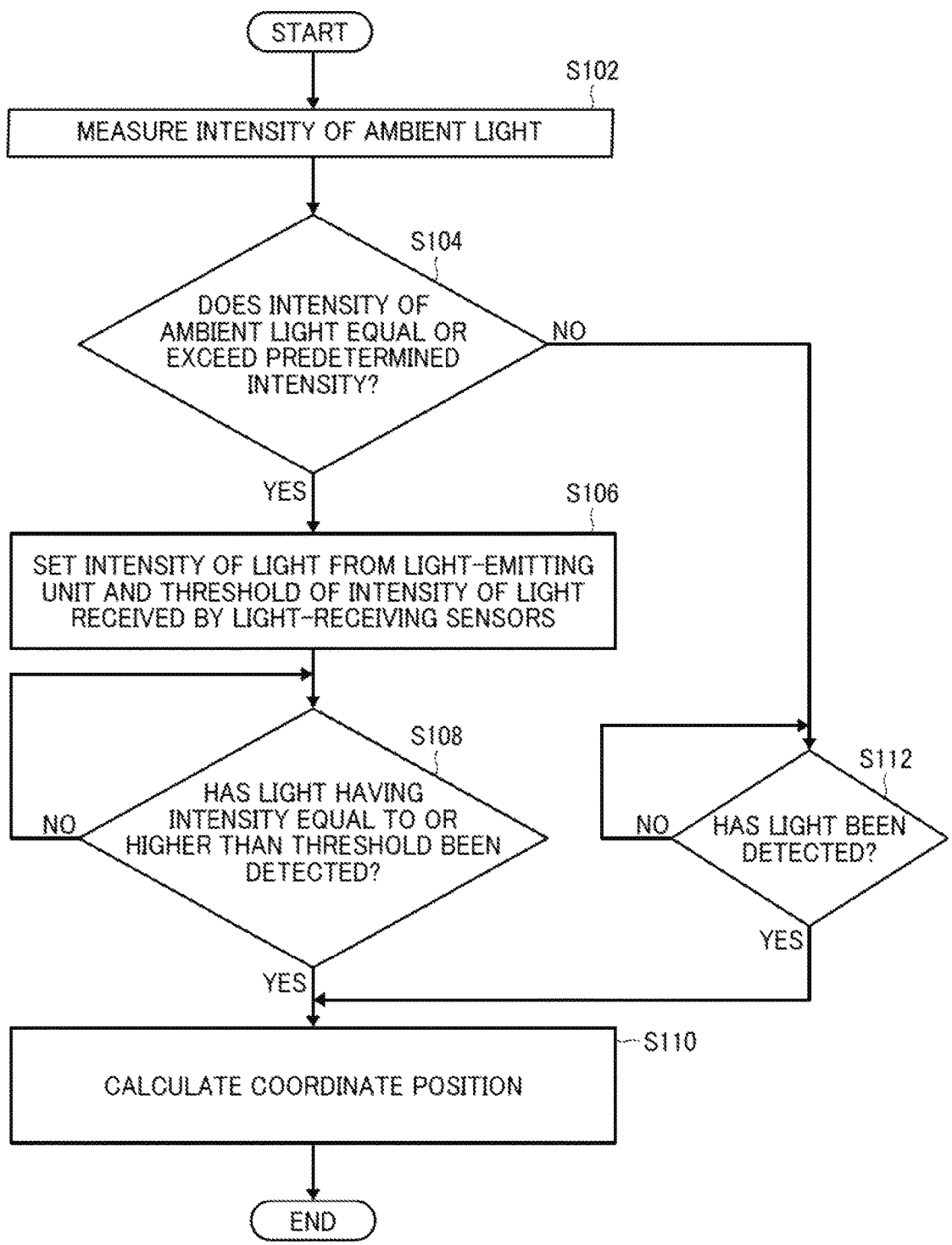
FIG. 13 is a flowchart of a coordinate detecting method performed by the coordinate detecting apparatus according to the first embodiment.

With reference to the flowchart of FIG. 13, the coordinate detecting method according to the first embodiment will be described in more detail.

At step S102, the intensity of ambient light is first measured. Specifically, the intensity of the ambient infrared light incident on each of the light-receiving sensors 300 and 310 through the IR filter is measured. For example, each of the light-receiving sensors 300 and 310 measures the intensity of the ambient infrared light when no light is emitted from the light-emitting unit 102 of the stylus input device 100.

At step S104, it is determined whether or not the intensity of the ambient light measured at step S102 equals or exceeds a predetermined intensity, such as the intensity of the light emitted from the light-emitting unit 102 of the stylus input device 100, for example. If the measured intensity of the ambient light equals or exceeds the predetermined intensity (YES at step S104), the procedure proceeds to step S106. If the measured intensity of the ambient light does not equal or exceed the predetermined intensity (NO at step S104), the procedure proceeds to step S112.

At step S106, the intensity of the light to be emitted from the light-emitting unit 102 of the stylus input device 100 is set, and a threshold of the intensity of the light to be detected by the light-receiving sensors 300 and 310 is set. For example, the intensity of the light to be emitted from the light-emitting unit 102 of the stylus input device 100 is set to be at least twice the detected intensity of the ambient light. Further, for example, the threshold of the intensity of the light to be detected by the light-receiving sensors 300 and 310 is set to be 1.5 times the detected intensity of the ambient light.

At step S108, it is determined whether or not the light-receiving sensors 300 and 310 have detected light having an intensity equal to or higher than the threshold. If the stylus input device 100 contacts the display surface 22, the light-emitting unit 102 emits pulsed light having an intensity higher than the threshold. Thus, the detection of the coordinate position takes place when light having an intensity higher than the threshold is detected. If the light-receiving sensors 300 and 310 have detected light having an intensity equal to or higher than the threshold (YES at step S108), therefore, the procedure proceeds to step S110. If the light-receiving sensors 300 and 310 have not detected light having an intensity equal to or higher than the threshold (NO at step S108), step S108 is repeated.

At step S110, the coordinate position of the light-emitting unit 102 of the stylus input device 100 is calculated based on angle information detected by the light-receiving sensors 300 and 310.

At step S112, it is determined whether or not the light-receiving sensors 300 and 310 have detected light. If the light-receiving sensors 300 and 310 have detected light (YES at step S112), the procedure proceeds to step S110. If the light-receiving sensors 300 and 310 have not detected light (NO at step S112), step S112 is repeated.

As described above, the first embodiment simply controls the current flowing through the LED. Accordingly, there is no need to add an extra component, for example, and the coordinate position is accurately detected at low cost despite the presence of ambient light.

A second embodiment of the present invention will be described.

The second embodiment employs the touch panel 24 (i.e., the coordinate detecting apparatus) according to the first embodiment, and replaces the stylus input device 100 (i.e., the light-emitting member) of the first embodiment with the interceptor (i.e., the non-light-emitting member) such as a finger of the operator to input information to the touch panel 24.

Figure 14:
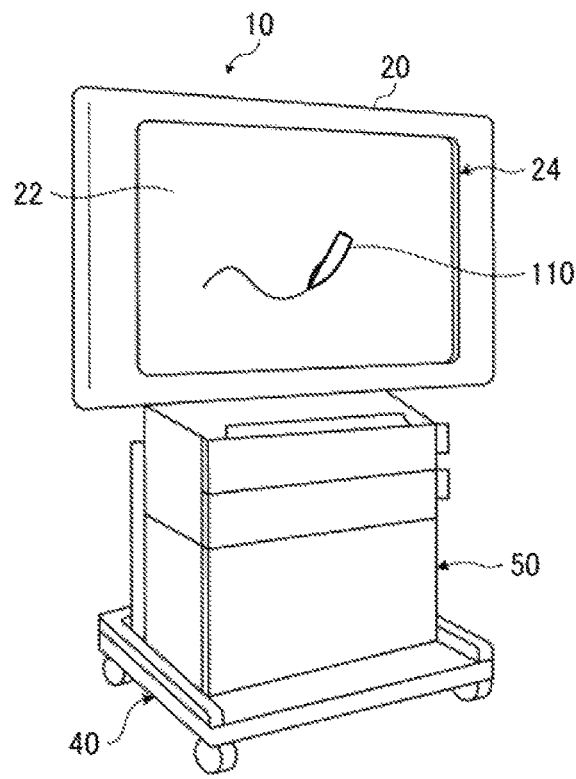
FIG. 14 is a perspective view of an electronic information board system using an interceptor.

Specifically, the touch panel 24 (i.e., the coordinate detecting apparatus) of the electronic information board system 10 is placed in the interceptor detection mode in TABLE 1 described above. Thereby, as illustrated in FIG. 14, if an end portion of an interceptor 110 contacts the display surface 22, a character or figure, for example, written or drawn at the coordinate position detected by the touch panel 24 is displayed. The electronic information board system 10 illustrated in FIG. 14 and the electronic information board system 10 illustrated in FIG. 1 are the same in configuration, but are different in information input mode (i.e., the interceptor detection mode or the light-emitting pen detection mode).

Figure 15:
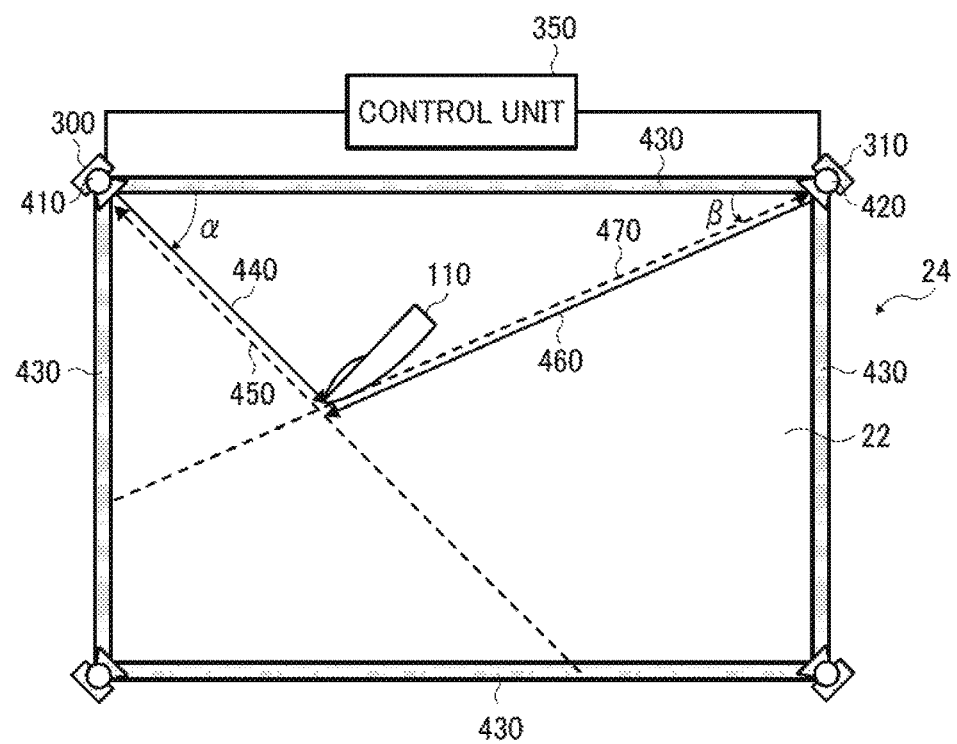
FIG. 15 is a diagram illustrating detection of coordinates performed when the interceptor is used.

A position detecting method according to the second embodiment will be described with reference to FIG. 15.

In the second embodiment, the control unit 350 turns on the illuminating light sources 410 and 420. If a tip portion of the interceptor 110 contacts the display surface 22 in this state, the beam 440 emitted from the illuminating light source 410 and the beam 460 emitted from the illuminating light source 420 are intercepted. The interceptor 110 intercepts the beam 450 of the light from the illuminating light source 410, which would be reflected by the corresponding retroreflective member 430 and incident on the light-receiving sensor 300 if the interceptor 110 were absent. The interceptor 110 further intercepts the beam 470 of the light from the illuminating light source 420, which would be reflected by the corresponding retroreflective member 430 and incident on the light-receiving sensor 310 if the interceptor 110 were absent. Consequently, the beams 450 and 470 fail to be incident on the light-receiving sensors 300 and 310, respectively.

Based on the detection signals from the light-receiving sensors 300 and 310, the control unit 350 detects the angle of inclination of the position minimizing the received infrared light amount relative to the horizontal direction, calculates the coordinate position with triangulation formula, and converts the calculated coordinate position into X-Y coordinates. Then, the display unit 20 displays the written character or the drawn figure, for example, based on the coordinate position calculated by the control unit 350.

FIG. 16A illustrates the relationship between the angle $\theta$ and the received light amount I detected by the light-receiving sensor 300 when the interceptor 110 contacts the display surface 22. FIG. 16B illustrates the relationship between the angle $\theta$ and the received light amount I detected by the light-receiving sensor 310 when the interceptor 110 contacts the display surface 22. The control unit 350 detects the angle $\alpha$, at which the received light amount I of the light-receiving sensor 300 is minimized, as the angle of the direction in which the interceptor 110 is present. The control unit 350 further detects the angle $\beta$, at which the received light amount I of the light-receiving sensor 310 is minimized, as the angle of the direction in which the interceptor 110 is present.

A coordinate detecting method according to the second embodiment will be described.

In the interceptor detection mode, the illuminating light sources 410 and 420 are constantly ON, as illustrated in FIG. 17. If the interceptor 110 is absent, the light emitted from the illuminating light source 410 is reflected by the corresponding retroreflective member 430 and incident on the light-receiving sensor 300, and the light emitted from the illuminating light source 420 is reflected by the corresponding retroreflective member 430 and incident on the light-receiving sensor 310. In the second embodiment, if the interceptor 110 contacts the display surface 22, the optical path of light emitted toward the interceptor 110 is intercepted. i.e., the light is prevented from being incident on the light-receiving sensor 300 or 310, making the detection of the position of the interceptor 110 possible.

In the second embodiment, the illuminating light sources 410 and 420 emit infrared light, and each of the light-receiving sensors 300 and 310 is equipped with an IR filter to allow only infrared light to be incident on the light-receiving sensors 300 and 310 through the IR filter.

Intense ambient light as illustrated in FIG. 18, however, may prevent accurate detection of the position of the interceptor 110. For example, if the intensity of the ambient light equals or exceeds the intensity of the light emitted from each of the illuminating light sources 410 and 420, the ambient light may be incident on the light-receiving sensors 300 and 310, while the light emitted from the illuminating light sources 410 and 420 is intercepted by the interceptor 110. Such a phenomenon may result in erroneous detection of the coordinate position or degradation in accuracy of the detection of the coordinate position.

This phenomenon will be described in more detail with reference to FIGS. 19A to 19F.

Figure 19A:
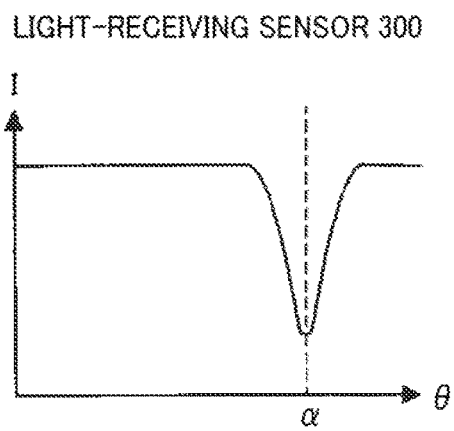
FIGS. 19A to 19F are graphs illustrating the relationship between the angle and the light amount incident on the light-receiving sensor when the interceptor is used.
Figure 19B:
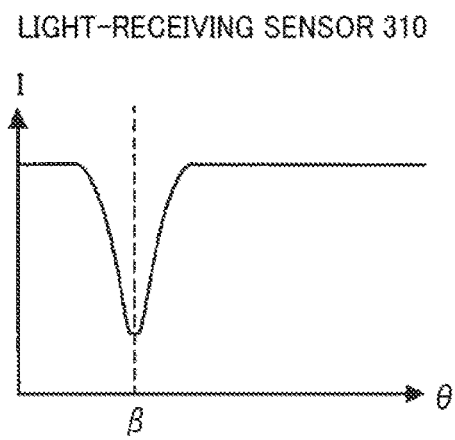
Figure 19C:
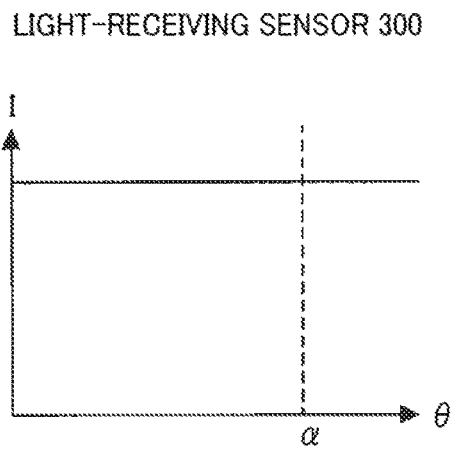
Figure 19D:
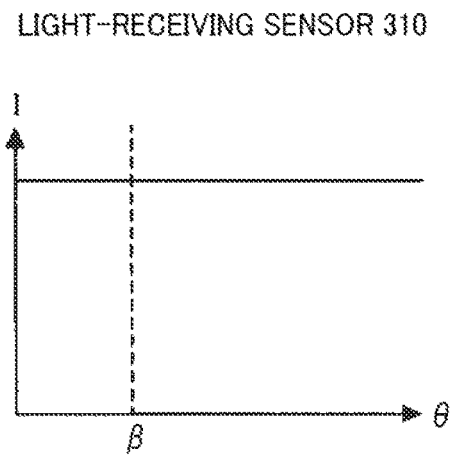
Figure 19E:
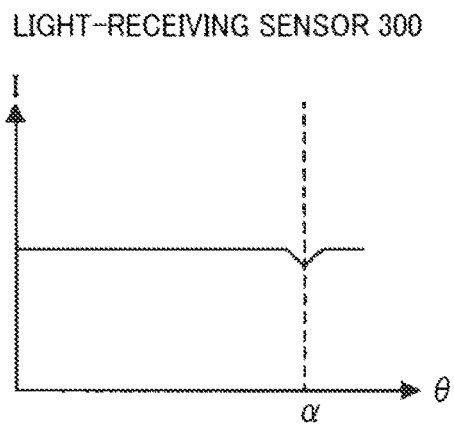
Figure 19F:
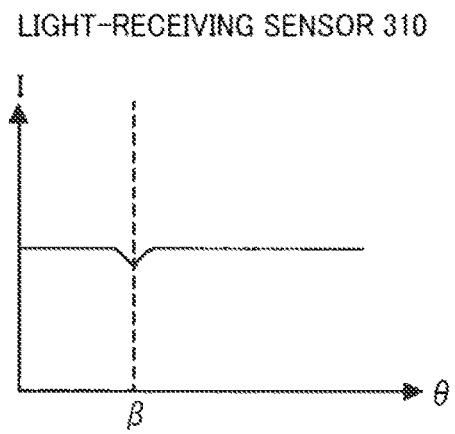

FIG. 19A illustrates the relationship between the angle $\theta$ and the received light amount I of the light incident on the light-receiving sensor 300 when the light emitted from the illuminating light source 410 is intercepted by the interceptor 110, and FIG. 19B illustrates the relationship between the angle $\theta$ and the received light amount I of the light incident on the light-receiving sensor 310 when the light emitted from the illuminating light source 420 is intercepted by the interceptor 110. FIG. 19C illustrates an example of the relationship between the angle $\theta$ and the received light amount I of the ambient infrared light incident on the light-receiving sensor 300, and FIG. 19D illustrates an example of the relationship between the angle $\theta$ and the received light amount I of the ambient infrared light incident on the light-receiving sensor 310. If there is ambient light, the light emitted from the illuminating light sources 410 and 420 and the ambient light are incident on the light-receiving sensors 300 and 310 at the same time. As illustrated in FIG. 19E, therefore, the received light amount I detected by the light-receiving sensor 300 corresponds to the received light amount I of the light-receiving sensor 300 in FIG. 19A and the received light amount I of the light-receiving sensor 300 in FIG. 19C superimposed upon each other. Similarly, as illustrated in FIG. 19F, the received light amount I detected by the light-receiving sensor 310 corresponds to the received light amount I of the light-receiving sensor 310 in FIG. 19B and the received light amount I of the light-receiving sensor 310 in FIG. 19D superimposed upon each other. In this case, the variation of the received light amount I is reduced at the minimum value of the received light amount I. That is, the more intense the ambient light is, the more difficult it is to detect the position of the interceptor 110. Although the illuminating light sources 410 and 420 are constantly ON in the above-described example, the illuminating light sources 410 and 420 may regularly repeat ON and OFF.

Figure 20:
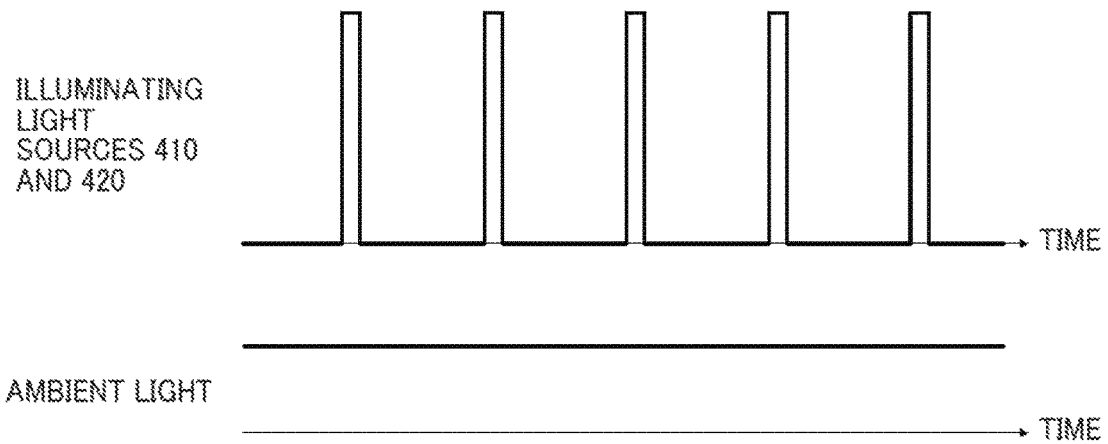
FIG. 20 is a chart illustrating detection of coordinates by a coordinate detecting apparatus according to a second embodiment of the present invention.

In the second embodiment, if ambient light more intense than the light emitted from the illuminating light sources 410 and 420 is detected, the control unit 350 increases the intensity of the light to be emitted from the illuminating light sources 410 and 420, as illustrated in FIG. 20. In the second embodiment, each of the illuminating light sources 410 and 420 includes an LED that emits infrared light. If the control unit 350 increases the current flowing through each of the illuminating light sources 410 and 420, therefore, the intensity of the light emitted from each of the illuminating light sources 410 and 420 is increased. If the control unit 350 reduces the light-emitting time of the LED, the current flowing through each of the illuminating light sources 410 and 420 is increased to emit strong light. For example, if the control unit 350 reduces the light-emitting time to approximately 0.1 ms, pulsed light is emitted with the intensity of the light multiplied by approximately ten times.

Figure 21A:
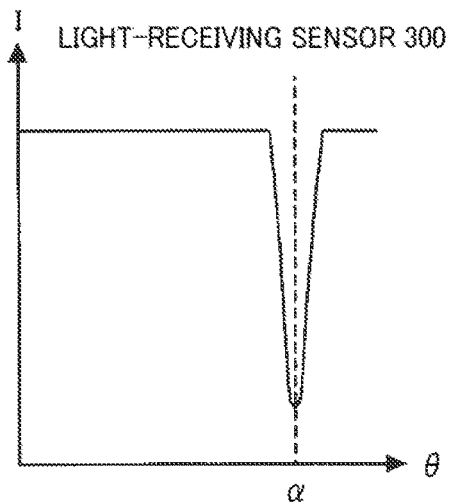
FIGS. 21A to 21F are graphs illustrating the relationship between the angle and the received light amount incident on the light-receiving sensor in the coordinate detecting apparatus according to the second embodiment.
Figure 21B:
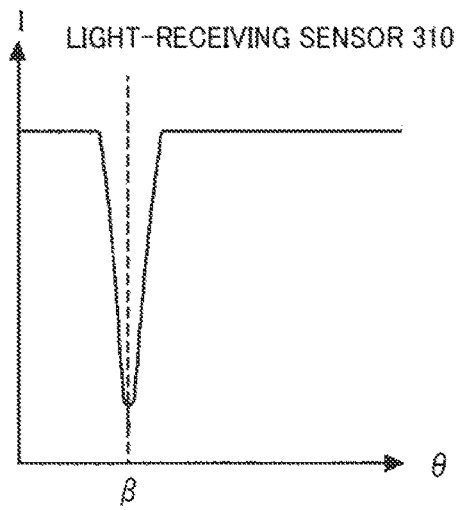
Figure 21C:
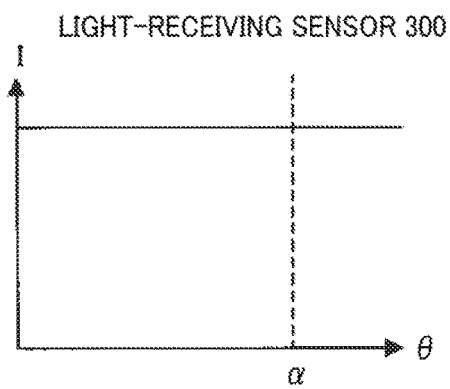
Figure 21D:
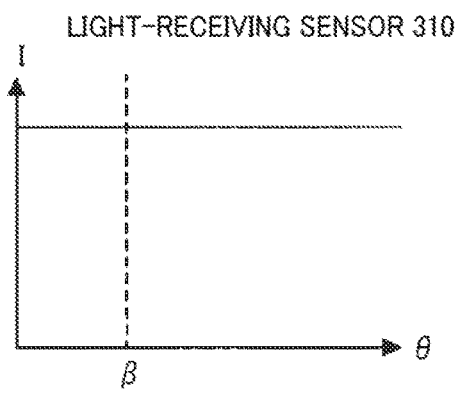
Figure 21E:
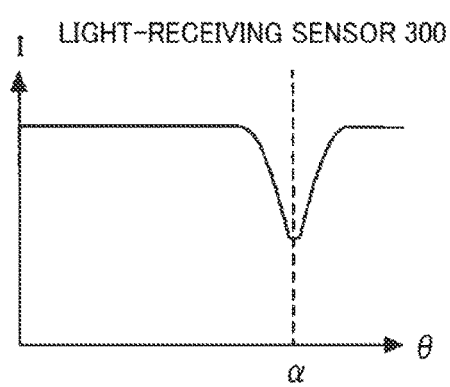
Figure 21F:
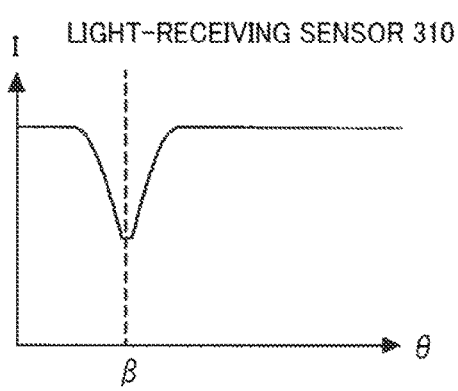

FIG. 21A illustrates the relationship between the angle θ and the received light amount I of the light incident on the light-receiving sensor 300 when the light emitted from the illuminating light source 410 is intercepted by the interceptor 110 in the second embodiment, and FIG. 21B illustrates the relationship between the angle θ and the received light amount I of the light incident on the light-receiving sensor 310 when the light emitted from the illuminating light source 420 is intercepted by the interceptor 110 in the second embodiment. FIG. 21C illustrates an example of the relationship between the angle θ and the received light amount I of the ambient infrared light incident on the light-receiving sensor 300, and FIG. 21D illustrates an example of the relationship between the angle θ and the received light amount I of the ambient infrared light incident on the light-receiving sensor 310. If there is ambient light, the light emitted from the illuminating light sources 410 and 420 and the ambient light are incident on the light-receiving sensors 300 and 310 at the same time. As illustrated in FIG. 21E, therefore, the received light amount I detected by the light-receiving sensor 300 corresponds to the received light amount I of the light-receiving sensor 300 in FIG. 21A and the received light amount I of the light-receiving sensor 300 in FIG. 21C superimposed upon each other. Similarly, as illustrated in FIG. 21F, the received light amount I detected by the light-receiving sensor 310 corresponds to the received light amount I of the light-receiving sensor 310 in FIG. 21B and the received light amount I of the light-receiving sensor 310 in FIG. 21D superimposed upon each other. In the second embodiment, the illuminating light sources 410 and 420 emit intense pulsed light. Therefore, the variation of the received light amount I is increased at the minimum value of the received light amount I, facilitating the detection of the position of the interceptor 110.

Figure 22:
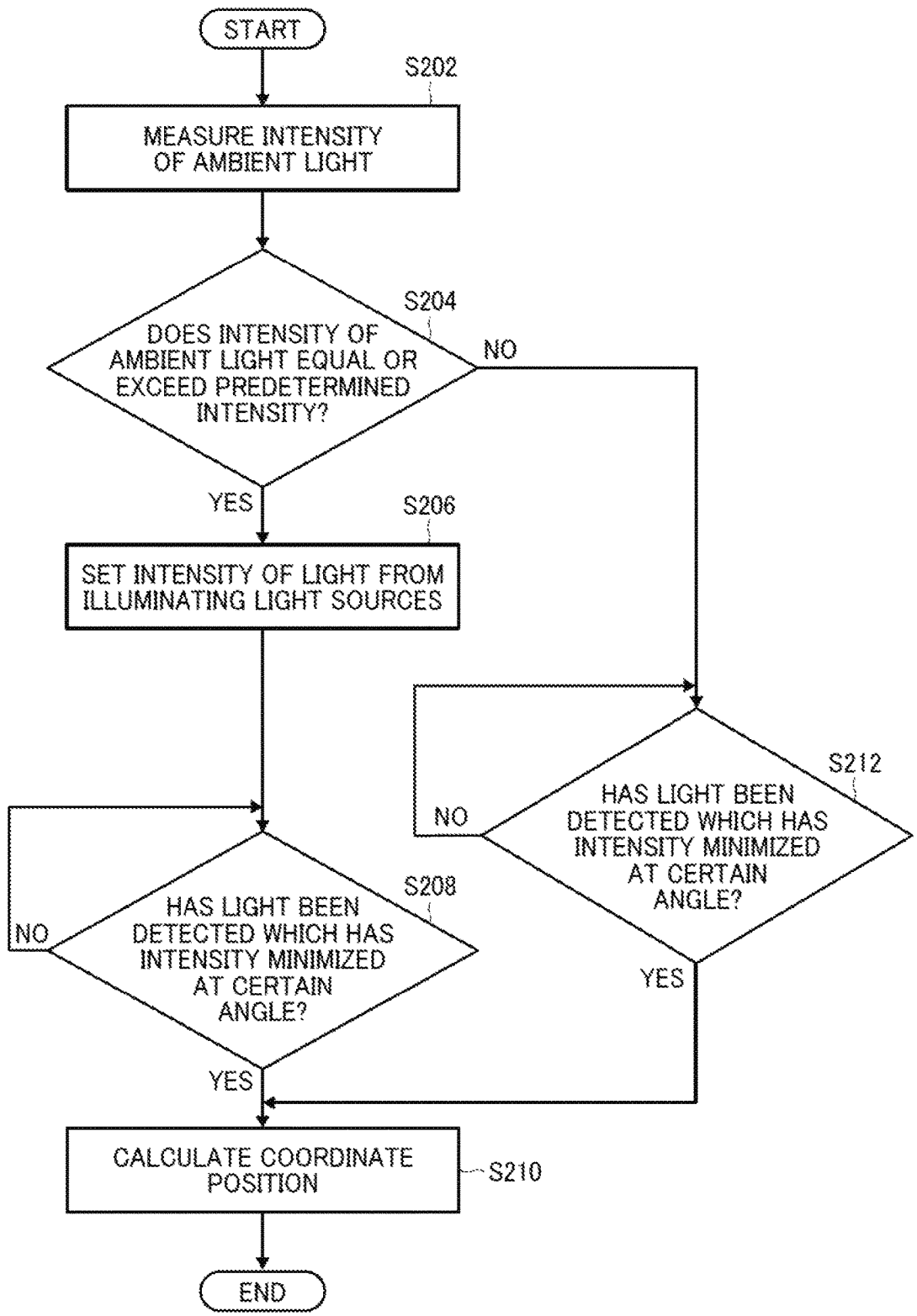
FIG. 22 is a flowchart of a coordinate detecting method performed by the coordinate detecting apparatus according to the second embodiment.

With reference to the flowchart of FIG. 22, the coordinate detecting method according to the second embodiment will be described in more detail.

At step S202, the intensity of ambient light is first measured. Specifically, the intensity of ambient infrared light incident on each of the light-receiving sensors 300 and 310 through the IR filter is measured. For example, each of the light-receiving sensors 300 and 310 measures the intensity of the ambient infrared light when the illuminating light sources 410 and 420 are OFF.

At step S204, it is determined whether or not the intensity of the ambient light measured at step S202 equals or exceeds a predetermined intensity, such as the intensity of the light emitted from the illuminating light sources 410 and 420, for example. If the measured intensity of the ambient light equals or exceeds the predetermined intensity (YES at step S204), the procedure proceeds to step S206. If the measured intensity of the ambient light does not equal or exceed the predetermined intensity (NO at step S204), the procedure proceeds to step S212.

At step S206, the intensity of the light to be emitted from the illuminating light sources 410 and 420 is set, and the illuminating light sources 410 and 420 are tuned on. For example, the intensity of the light to be emitted from the illuminating light sources 410 and 420 is set to be at least twice the detected intensity of the ambient light, and then the illuminating light sources 410 and 420 are turned on.

At step S208, it is determined whether or not the light-receiving sensors 300 and 310 have detected light having an intensity that is minimized at a certain angle. If the light-receiving sensors 300 and 310 have detected the light having the intensity that is minimized at a certain angle (YES at step S208), the procedure proceeds to step S210. If the light-receiving sensors 300 and 310 have not detected the light having the intensity that is minimized at a certain angle (NO at step S208), step S208 is repeated. In the second embodiment, whether or not the light-receiving sensors 300 and 310 have detected the light having the intensity that is minimized at a certain angle may be determined based on the value resulting from subtracting the intensity of the ambient light from the intensity of the light detected by the light-receiving sensors 300 and 310.

At step S210, the coordinate position of the interceptor 110 is calculated based on the angle information detected by the light-receiving sensors 300 and 310.

At Step S212, it is determined whether or not the light-receiving sensors 300 and 310 have detected the light having the intensity that is minimized at a certain angle. If the light-receiving sensors 300 and 310 have detected the light having the intensity that is minimized at a certain angle (YES at step S212), the procedure proceeds to step S210. If the light-receiving sensors 300 and 310 have not detected the light having the intensity that is minimized at a certain angle (NO at step S212), step S212 is repeated. The second embodiment is similar to the first embodiment in aspects other than those described above.

A third embodiment of the present invention will be described.

The third embodiment employs the touch panel 24 (i.e., the coordinate detecting apparatus) according to the first embodiment, and uses the interceptor 110 (i.e., the nonlight-emitting member) such as a finger of the operator to input information, similarly as in the second embodiment.

Figure 23:
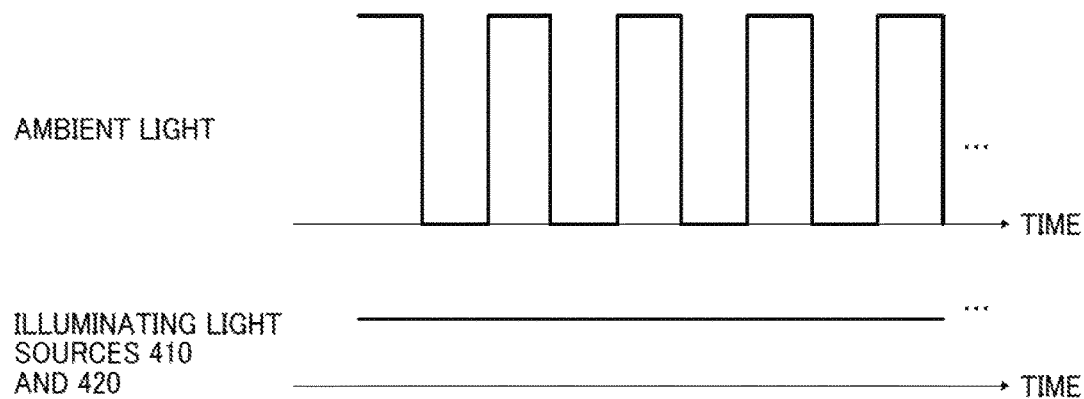
FIG. 23 is a chart illustrating detection of coordinates performed when the interceptor is used.

As illustrated in FIG. 23, the ambient light may periodically alternate between emission state and non-emission. An increase in intensity of such ambient light may prevent accurate detection of the position of the interceptor 110. For example, when two touch panels 24 (i.e., coordinate detecting apparatuses) are being used in close proximity to each other, the light emitted from the stylus input device 100 (i.e., the light-emitting pen) for one of the two touch panels 24 acts as such ambient light, which periodically alternates between emission and non-emission, to the other touch panel 24.

Figure 24:
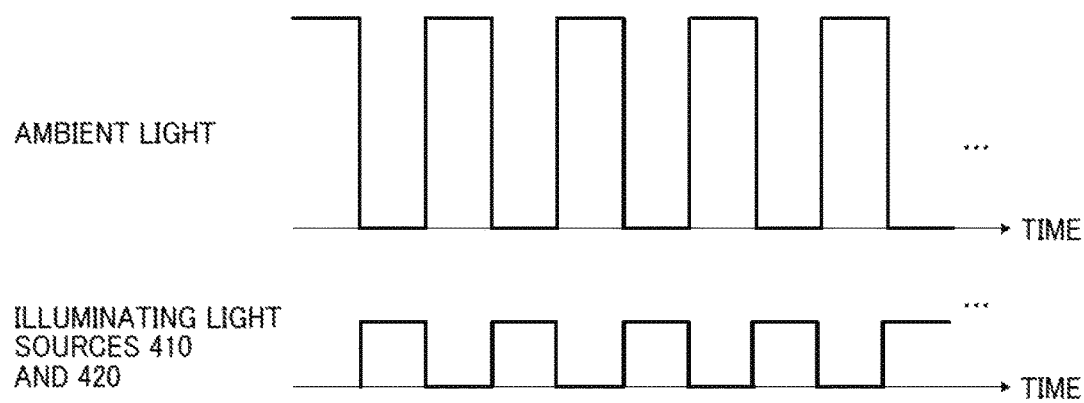
FIG. 24 is a chart illustrating detection of coordinates by a coordinate detecting apparatus according to a third embodiment of the present invention.

In the third embodiment, if the ambient light periodically alternating between emission and non-emission is detected, the control unit 350 places the illuminating light sources 410 and 420 in the ON state when the ambient light is not emitted, and places the illuminating light sources 410 and 420 in the OFF state when the ambient light is emitted, as illustrated in FIG. 24. Such control of the ON-OFF periodicity of the illuminating light sources 410 and 420 may be performed when the intensity of the ambient light equals or exceeds the intensity of the light emitted from the illuminating light sources 410 and 420.

Figure 25:
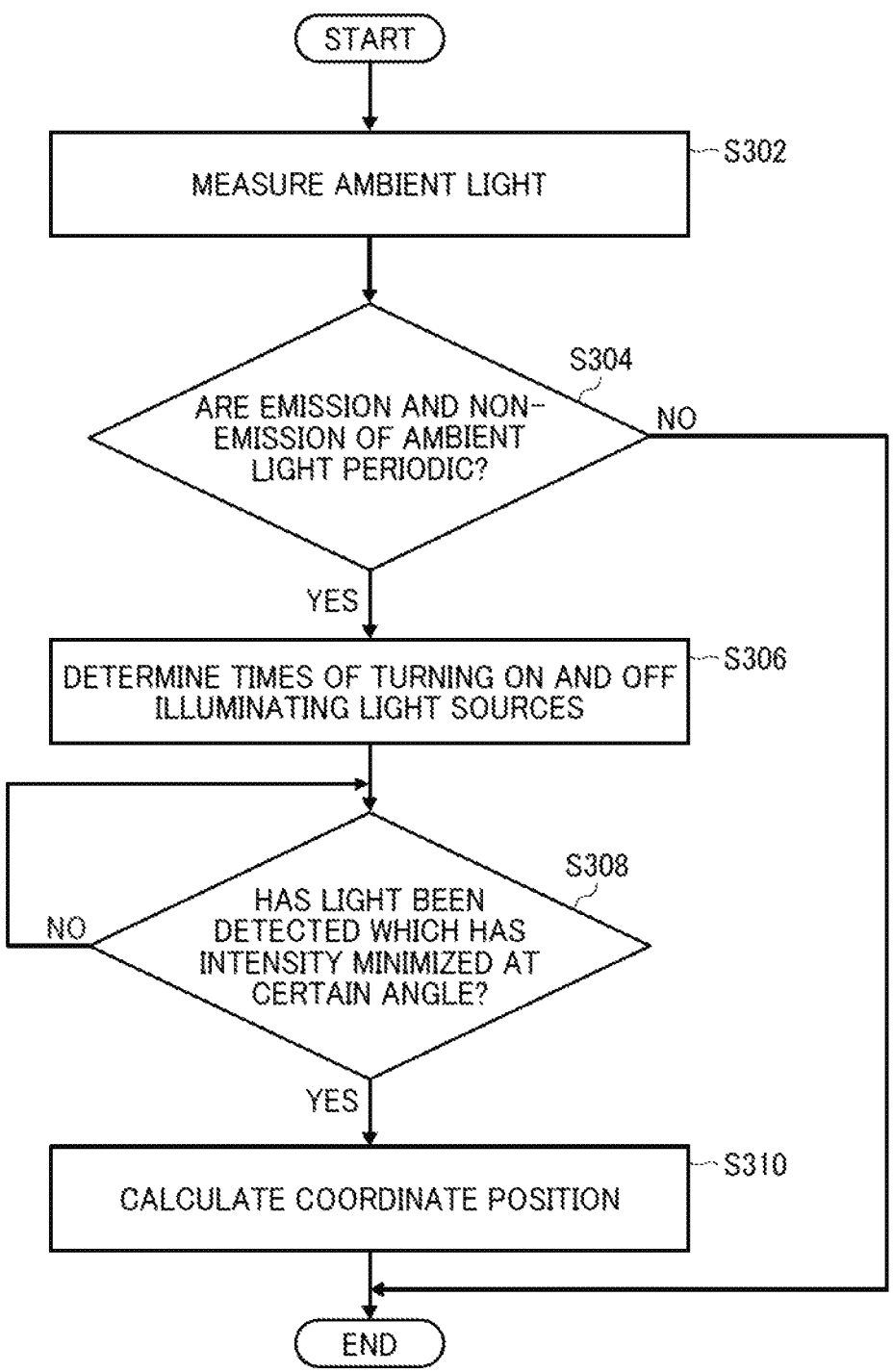
FIG. 25 is a flowchart of a coordinate detecting method performed by the coordinate detecting apparatus according to the third embodiment.

A coordinate detecting method according to the third embodiment will be described in detail with reference to the flowchart of FIG. 25.

At step S302, the ambient light is first measured. Specifically, a change over time of the intensity of the ambient infrared light incident on each of the light-receiving sensors 300 and 310 through the IR filter is measured. For example, each of the light-receiving sensors 300 and 310 measures the change in intensity of the ambient infrared light when the illuminating light sources 410 and 420 are OFF.

At step S304, based on the change over time of the intensity of the ambient light measured at step S302, it is determined whether or not the emission and non-emission of the ambient light are periodic. If the emission and non-emission of the ambient light are periodic (YES at step S304), the procedure proceeds to step S306. If the emission and non-emission of the ambient light are not periodic (NO at step S304), the procedure is completed. The coordinate detecting method according to the third embodiment may further take the intensity of the ambient light into account. Specifically, if the intensity of the ambient light equals or exceeds the intensity of the light emitted from the illuminating light sources 410 and 420, and if the emission and non-emission of the ambient light are periodic, the procedure may proceed to step S306. If the intensity of the ambient light is lower than the intensity of the light emitted from the illuminating light sources 410 and 420, or if the emission and non-emission of the ambient light are not periodic, the procedure may be completed.

At step S306, the time of turning on the illuminating light sources 410 and 420 and the time of turning off the illuminating light sources 410 and 420 are determined, and the illuminating light sources 410 and 420 are turned on and off at the thus-determined times. Specifically, the time of tuning on the illuminating light sources 410 and 420 and the time of turning off the illuminating light sources 410 and 420 are determined such that the illuminating light sources 410 and 420 are ON when the ambient light is not emitted and that the illuminating light sources 410 and 420 are OFF when the ambient light is emitted. Then, the illuminating light sources 410 and 420 are alternately turned on and off at the thus-determined times. Therefore, the ON-OFF period of the illuminating light sources 410 and 420 is the same as the period of emission and non-emission of the ambient light, and the phase of the ambient light and the phase of the light emitted from the illuminating light sources 410 and 420 are shifted from each other by half the period.

At step S308, it is determined whether or not the light-receiving sensors 300 and 310 have detected the light having the intensity that is minimized at a certain angle when the illuminating light sources 410 and 420 are ON. If the light-receiving sensors 300 and 310 have detected the light having the intensity that is minimized at a certain angle when the illuminating light sources 410 and 420 are ON (YES at step S308), the procedure proceeds to step S310. If the light-receiving sensors 300 and 310 have not detected the light having the intensity that is minimized at a certain angle when the illuminating light sources 410 and 420 are ON (NO at step S308), step S308 is repeated.

At step S310, the coordinate position of the interceptor 110 is calculated based on the angle information detected by the light-receiving sensors 300 and 310. The third embodiment is similar to the second embodiment in aspects other than those described above.

According to the disclosed embodiments of the coordinate detecting apparatus, the coordinate position is accurately detected at low cost despite the presence of ambient light.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the above-described steps are not limited to the order disclosed herein.

The invention claimed is:

1. A coordinate detecting apparatus, comprising:
a plurality of light-receiving sensors to detect light emitted from a light-emitting member in a detection area;
a plurality of illuminating light sources to emit light;
a reflective member disposed around a detection area to reflect the light emitted from the plurality of illuminating light sources;
a controller configured to detect a position of the light-emitting member based on the light detected by the plurality of light-receiving sensors, and control the light-emitting member such that an intensity of the light emitted from the light-emitting member is higher than an intensity of ambient light incident on the plurality of light-receiving sensors,
wherein the plurality of light-receiving sensors detect the light reflected by the reflective member;
the controller is further configured to detect a position of a non-light-emitting member in the detection area based on the light detected by the plurality of light-receiving sensors, and control the plurality of illuminating light sources such that an intensity of the light emitted from the plurality of illuminating light sources is higher than the intensity of the ambient light incident on the plurality of light-receiving sensors;
when the intensity of the ambient light incident on the plurality of light-receiving sensors is equal to at least the intensity of the light emitted from the plurality of illuminating light sources, reflected by the reflective member, and incident on the plurality of light-receiving sensors, the controller is further configured to increase the intensity of the light emitted from the plurality of illuminating light sources to be higher than the intensity of the ambient light incident on the plurality of light-receiving sensors; and the controller is further configured to the position of the non-light-emitting member based on a value resulting from subtracting the intensity of the ambient light from the intensity of the light incident on the plurality of the light-receiving sensors.

2. The coordinate detecting apparatus of claim 1, wherein when the intensity of the ambient light incident on the plurality of light-receiving sensors is equal to at least the intensity of the light emitted from the light-emitting member, the controller is further configured to increase the intensity of the light emitted from the light-emitting member to be higher than the intensity of the ambient light incident on the plurality of light-receiving sensors.

3. The coordinate detecting apparatus of claim 1, wherein based on the intensity of the ambient light, the controller is further configured to set a threshold for an intensity of the light detected by the plurality of light-receiving sensors, and
wherein the controller is further configured to detect the position of the light-emitting member based on the detected light having an intensity equaling at least the threshold.

4. The coordinate detecting apparatus of claim 1, wherein the light-emitting member includes a light-emitting diode, and
wherein the controller is further configured to increase current flowing through the light-emitting diode to increase the intensity of the light emitted from the light-emitting member.

5. The coordinate detecting apparatus of claim 1, wherein each of the plurality of illuminating light sources includes a light-emitting diode, and wherein the controller is further configured to increase a current flowing through the light-emitting diode to increase the intensity of light emitted from each of the plurality of illuminating light sources.

6. The coordinate detecting apparatus of claim 1, wherein when the ambient light incident on the plurality of light-receiving sensors periodically alternates between emission and non-emission, the controller is further configured to cause the plurality of illuminating light sources to emit light with a period equal to a period of the ambient light and with a phase shifted from a phase of the ambient light.

7. The coordinate detecting apparatus of claim 6, wherein when the ambient light incident on the plurality of light-receiving sensors periodically alternates between emission and non-emission, the controller is further configured to place the plurality of illuminating light sources in an off state when the ambient light is emitted, and the controller is further configured to place the plurality of illuminating light sources in an on state when the ambient light is not emitted.

8. The coordinate detecting apparatus of claim 7, wherein when the intensity of the ambient light incident on the plurality of light-receiving sensors is equal to at least the intensity of the light emitted from the plurality of illuminating light sources, reflected by the reflective member, and incident on the plurality of light-receiving sensors, the controller is further configured to periodically repeat the on state and the off state of the plurality of illuminating light sources.

* * * * *